(12) United States Patent
Ren (10) Patent No.: US 9,094,800 B2
(45) Date of Patent: Jul. 28, 2015

(54) SYSTEM AND METHOD FOR PREVENTING DRIVER USE OF A MOBILE DEVICE (71) Applicant: Cellco Partnership, Basking Ridge, NJ (US)

(72) Inventor: Xin Ren, Warren, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 86 days.

(21) Appl. No.: 13/915,344

(22) Filed: Jun. 11, 2013

(65) Prior Publication Data

US 2014/0364153 A1   Dec. 11, 2014

(51) Int. Cl.
*H04W 4/02* (2009.01)
*H04W 4/04* (2009.01)

(52) U.S. Cl.
CPC ..................................... *H04W 4/046* (2013.01)

(58) Field of Classification Search
CPC .............................. H04W 4/046; H04W 4/027
USPC ............... 455/456.1, 456.4, 466, 457, 569.1, 455/569.2
See application file for complete search history.

(56) References Cited

U.S. PATENT DOCUMENTS

| | | | |
|---|---|---|---|
| 7,856,203 B2 * | 12/2010 | Lipovski | 455/1 |
| 8,816,836 B2 * | 8/2014 | Lee et al. | 340/439 |
| 8,838,185 B2 * | 9/2014 | Blanda et al. | 455/569.1 |
| 2007/0264981 A1 * | 11/2007 | Miller | 455/414.1 |
| 2011/0077032 A1 * | 3/2011 | Correale et al. | 455/466 |
| 2011/0295458 A1 * | 12/2011 | Halsey-Fenderson | 701/29 |
| 2012/0220284 A1 * | 8/2012 | Tadayon et al. | 455/418 |
| 2013/0172018 A1 * | 7/2013 | Correale et al. | 455/456.4 |
| 2013/0210406 A1 * | 8/2013 | Vidal et al. | 455/418 |

* cited by examiner

*Primary Examiner* — Cong Tran (57) ABSTRACT

A system and method are disclosed for restricting driver access to mobile devices while driving. The system includes an interface which facilities communicating with the vehicle and communicates with mobile devices present in the vehicle. The system determines the location of each mobile device in the vehicle in order to identify the mobile device belonging to the driver. If the vehicle is currently moving, functions of the driver's mobile device can be restricted or limited, while allowing passengers full access to their mobile devices.

17 Claims, 7 Drawing Sheets

SYSTEM AND METHOD FOR PREVENTING DRIVER USE OF A MOBILE DEVICE

BACKGROUND INFORMATION

Consumer adoption of mobile devices, such as cellular telephones, laptop computers, pagers, personal digital assistants, and the like, has increased dramatically over recent years. These devices can be used for a diversity of purposes ranging from basic communications, to conducting business transactions, to managing entertainment media, as well as a host of other tasks. Additional enhancements, such as location-awareness features, e.g., global positioning system (GPS) tracking, also enable mobile device users to monitor their position and present their location via a local display. Distracted driving has also emerged as a growing problem among drivers who actively use communication apps such as, for example, e-mail, SMS (text) messaging, social media, etc. In fact, distracted driving is considered to be one of the leading causes of car accidents. The availability of mobile devices, such as mobile phones, tablets, personal digital assistants (PDA's), etc., contributes greatly to this problem.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for detecting and disabling and/or restricting the use of a mobile device by a driver, is described. In the following description, for the purposes of explanation, numerous specific details are set forth in order to provide a thorough understanding of the various embodiments described. It is apparent, however, to one skilled in the art that the various embodiments described may be practiced without these specific details or with an equivalent arrangement. In other instances, well-known structures and devices are shown in block diagram form in order to avoid unnecessarily obscuring the various embodiments.

Figure 1:
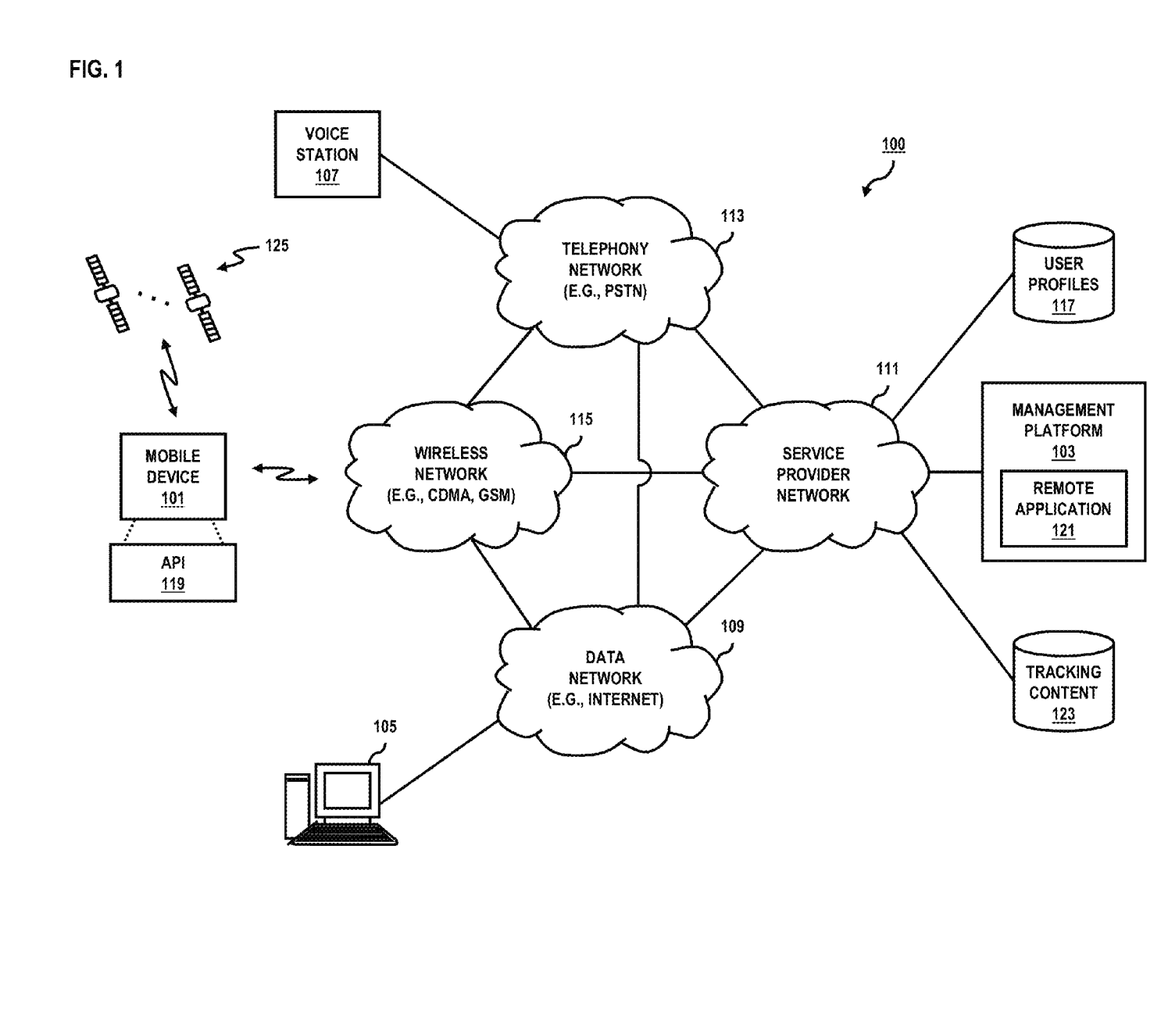
FIG. 1 is a diagram of a system capable of restricting the use of mobile devices, according to one embodiment.

FIG. 1 is a diagram of a system configured to provide remote control and tracking services for mobile devices, according to an exemplary embodiment. For the purpose of illustration, system 100 for remotely controlling and tracking one or more mobile devices 101, such as one or more cellular phones, is described with respect to management platform (or platform) 103. According to certain embodiments, users at user or client devices (e.g., computing device 105, voice station 107, or another mobile device (not shown)) may access the features and functionalities of platform 103 over one or more networks, such as data network 109, service provider network 111, telephony network 113, and/or wireless network 115, in order to remotely determine and monitor the location and/or surrounding environment of their mobile devices 101 when, for instance, the users misplace (or otherwise lose) these devices 101. Additionally (or alternatively), platform 103 may enable users to remotely control mobile devices 101 in order to, for example, backup or erase a memory (not shown), capture signals from an interface (e.g., audio interface, imaging interface, etc.), configure (or reconfigure) functions, obtain usage logs, terminate services, etc., of or associated with these devices 101. While specific reference will be made hereto, it is contemplated that system 100 may embody many forms and include multiple and/or alternative components and facilities.

It is observed that portable device users who enjoy an increased level of mobility have to be mindful of their location, as well as keep a vigilant eye on their devices to ensure the devices and/or information stored thereon is not misplaced, lost, or stolen. Traditionally, when a portable device went missing, for whatever the cause, the use of conventional approaches to locate and recover the device or, at least, identify a potential perpetrator, e.g., a thief, has yielded little, if any, success. Moreover, most mobile device owners rely on password and encryption techniques to protect valuable or otherwise sensitive information stored to their devices; however, even encrypted data, once in the hands of another, may be eventually decrypted. As a consequence, a void exists in the marketplace for effective and efficient techniques to remotely control and track mobile devices, such as for the purpose of locating and recovering missing devices or identifying potential perpetrators.

Therefore, the approach of system 100, according to certain exemplary embodiments, stems from the recognition that consumers can benefit from remote control and tracking services, whereby subscribers (or users) are given access to a management platform for remotely activating at least one application on their devices, such as one or more mobile devices, for locating and/or controlling these devices. For instance, subscribers may access the management platform for remotely activating an application on a mobile device for controlling an audio interface (e.g., a microphone) and/or an imaging interface (e.g., a camera) of the mobile device to capture one or more signals from the audio interface or the imaging interface. Captured signals may relate to acoustic and/or visual indicia of an environment surrounding the mobile device, which may be utilized by a subscriber to locate and retrieve their device or identify a potential perpetrator who may have stolen or inadvertently taken possession of the device. In other instances, remotely activating an application on the mobile device may cause the mobile device to return spatial positioning information (e.g., an address, latitude, longitude, elevation, etc.) corresponding to a location of the device. This spatial positioning information may be overlaid on, for instance, a topological depiction of a geographic area surrounding the location of the device, which may also be appended with various cartographic features, such as buildings, landmarks, roadways, signs, and the like, or provided with directions to the location of the device. Subscribers may also be given access to the management platform to remotely activate at least one application on their device to control or configure one or more features of the device. For example, an application may be remotely activated in order to image (or backup) a memory of a mobile device, as well as store the image to, for instance, a networked repository. Subscribers may also be enabled to erase a memory of the mobile device, such as for the purpose of purging the device of personal or otherwise sensitive information. Still further, an application may be remotely activated in order to configure features of or services available to the mobile device, such as to monitor or deactivate an ability of the mobile device to transmit and receive information.

Accordingly, in some embodiments, system 100 facilitates remote mobile device controlling and tracking by enabling subscribers (or users) to access management platform 103 via one or more client devices (e.g., computing device 105, voice station 107, or another mobile device (not shown)) to register to the remote control and tracking services of system 100, as well as to create, customize, and manage one or more user profiles stored to, for example, user profiles repository 117 or any other suitable storage location of (or accessible to) the components or facilities of system 100. In this manner, subscribers may submit requests to platform 103 in order to remotely control, configure, monitor, register, and/or track their mobile devices 101. In response thereto, platform 103 may generate one or more control signals to remotely activate one or more applications (or application programming interfaces (API)) 119 on mobile devices 101 for remotely controlling, configuring, monitoring, and/or tracking these devices 101. Control signals may be transmitted to mobile devices 101 over one or more of networks 109-115, such as transmitted over one or more of networks 109-115 as part of one or more API 119 directed messages (e.g., API 119 short messaging service (SMS) directed messages). It is noted that management platform 103 is described in more detail in accordance with FIG. 2.

In certain exemplary embodiments, access to platform 103 may be obtained via any suitable portal interface (not illustrated), such as a voice portal or a web portal. For example, a networked remote application 121 for implementing the portal may be deployed via platform 103; however, it is contemplated that another facility or component of system 100, such as a frontend, middleware, or backend server, may deploy remote application 121 and, consequently, interface with platform 103. As such, it is contemplated that remote application 121 may be implemented on one or more of client devices 101, 105, and/or 107 and, thereby, configured to interface with platform 103. In certain embodiments, one or more remote applications 121 may function in conjunction with one another to achieve the features and functionalities of system 100, such as one or more of the processes described herein for remotely controlling and/or tracking mobile devices 101.

The portal may include or provide users with the ability to access, configure, manage, and store user profile information to user profiles repository 117, as well as the ability to remotely control, configure, monitor, and/or track their mobile devices 101. As such, platform 103 may be configured to receive or retrieve tracking content from mobile devices 101 and, thereby, store this tracking content to, for example, tracking content repository 123. It is contemplated that tracking content may be additionally (or alternatively) stored to any other suitable storage location or memory of (or accessible to) the components or facilities of system 100. Further, tracking content may generally relate to any signals or information retrieved (or received) from mobile devices 101 that have been (or currently are being) remotely controlled, configured, monitored, tracked, etc. In this manner, the portal may provide subscribers with access to tracking content of tracking content repository 123.

As seen in FIG. 1, platform 103 includes remote application 121 for generating commands, instructions, parameters, and/or signals (hereinafter collectively referred to as "control signals") that may be executed on (or by) mobile device 101 via API(s) 119. These control signals are utilized to remotely activate API(s) 119 to control, configure, monitor, or track mobile device 101 in response to, for instance, a request to control, configure, monitor, or track mobile device 101 by an authorized subscriber of the remote control and tracking services of system 100. In this manner, the control signals may be utilized to generate, store, or otherwise implement configuration information based on received control signal(s). According to one embodiment, control signals may also be utilized to control an audio interface (e.g., a microphone) or an imaging interface (e.g., a camera) of mobile device 101 to capture one or more signals from the audio interface or the imaging interface. Captured signals may relate to acoustic and/or visual indicia of an environment surrounding mobile device 101, which may be utilized by a subscriber to locate and retrieve their device or identify a potential perpetrator who may have stolen or inadvertently taken possession of the device.

In other instances, remote application 121 may generate control signals to remotely activating API(s) 119 on mobile device 101 to cause mobile device 101 to return spatial positioning information (e.g., an address, latitude, longitude, elevation, etc.) corresponding to a location of mobile device 101. Accordingly, mobile device 101 may be configured to determine corresponding spatial positioning information through conventional satellite positioning system (SPS) technology, such as GPS technology; however, any suitable navigational or location determination technology may be utilized, such as advanced forward link trilateration (A-FLT), assisted-GPS (A-GPS), enhanced cellular identification (CELL-ID), wireless area network (WLAN) positioning, etc. As is well known, SPS technology utilizes a constellation 125 of satellites that transmit signals to receivers (not shown) of, for example, one or more mobile devices 101, so that the receivers may determine corresponding spatial positions (or locations), speeds, directions, and/or timing for mobile devices 101. Mobile devices 101 may report this information to platform 103 to facilitate the remote control and/or tracking services of system 100. It is also noted that platform 103 may "poll" or receive such spatial positioning information from mobile devices 101 in real-time, so as to provide presence service features related to mobile devices 101. As such, the location of, for instance, mobile device 101 may be detected without mobile device 101 having to initiate a phone call or other like communication session. Thus, platform 103 may be configured to present received and/or retrieved spatial positioning information to subscribers, such as via one or more GUI(s). It is also noted that spatial positioning information may be stored to user profiles repository 117 or any other suitable storage location or memory of (or accessible to) system 100.

Accordingly to particular embodiments, spatial positioning information corresponding to a location of mobile device 101 may be overlaid on, for instance, a topological depiction of a geographic area surrounding the location of mobile device 101, which may also be appended with various cartographic features, such as buildings, landmarks, roadways, signs, and the like, or provided with directions to the location of mobile device 101.

Subscribers may also be given access to the management platform to remotely activate API(s) 119 on mobile devices 101 to control or configure one or more features of the device. For example, API(s) 119 may be remotely activated in order to image (or backup) a memory (not shown) of mobile device 101, as well as store the image to, for instance, a networked repository, such as tracking content repository 123. Subscribers may also be enabled to erase a memory of mobile device 101, such as for the purpose of purging mobile device 101 of personal or otherwise sensitive information. Still further, API (s) 119 may be remotely activated to configure features of or services available to mobile device 101, such as to monitor or deactivate an ability of mobile device 101 to transmit and receive information. For instance, control signals may be transmitted to mobile device 101 by platform 103 in order to "lock" mobile device 101 until an appropriate "unlock" code (or signal) is input (or transmitted) to device 101. As another example, subscribers may be enabled to request platform 103 to monitor usage of mobile device 101 and, thereby, provide a "log" of such use, which may also enable subscribers to determine whether or not their devices have been stolen and/or being utilized for illicit (or otherwise unauthorized) purposes.

Accordingly, platform 103 via, for example, remote application 121 may be configured to issue control signals via various bearers to mobile devices 101, such as in the form of one or more call control setup messages, short messaging service (SMS) messages, enhanced messaging service (EMS) messages, multimedia messaging service (MMS) messages, electronic mail, files, or any other suitable bearer, as well as any suitable combination thereof. In particular implementations, these bearer mediums may include control signals in various forms, including attention (AT) commands, menu traversal paths, function codes, voice data, dual-tone multi-frequency (DTMF) signals, scripts, strings, parameters, object variables, and the like. It is noted that these control signals can be used in lieu of "software code," and therefore, may be directly integrated into the control logic of mobile device 101, thereby requiring less processing and hence, less power. It is contemplated, however, that coded instructions may also be utilized. As such, these control signals may be utilized by API(s) 119 to facilitate the remote control and/or tracking services of system 100.

It is noted that control signals generated by, for example, remote application 121 of platform 103 may be transmitted to mobile devices 101 via one or more of communication networks 109-115. To prevent unauthorized individuals from accessing the remote control and/or tracking services of platform 103, authentication information may be required. For instance, a username and password procedure may be employed. According to one embodiment, subscribers may be required to enter a code (e.g., personal identification number (PIN), etc.) before accessing the features and functionality of platform 103. Similarly, to prevent the implementation of unauthorized control signals otherwise received at mobile device 101, platform 103 may include an authentication identifier when transmitting control signals to mobile devices 101. For instance, control signals may be encrypted, either symmetrically or asymmetrically, such that a hash value can be utilized to authenticate received control signals, as well as ensure that those control signals have not been impermissibly alerted in transit. As such, control signals may include various identifiers, keys, random numbers, random handshakes, digital signatures, and the like. Further, these authenticating schemas may themselves be encrypted or otherwise secured.

According to exemplary embodiments, mobile devices 101 may include one or more application protocol interfaces (API), such as a set of APIs included within, for example, a binary runtime environment for wireless (BREW) platform, for receiving control signals from platform 103 and, thereby, for being remotely activated, controlled, configured, monitored, tracked, etc., by platform 103. It is contemplated, however, that one or more other mobile client applications may be utilized, such as one or more applications written in one or more programming languages, such as C, C++, J2ME, Java, etc. As such, API(s) 119 may be configured to, in response to control signals being received from, for instance, platform 103, enable one or more signals to be captured from an audio interface (e.g., a microphone) or an imaging interface (e.g., a camera) of mobile device 101. These signals may relate to acoustic(s) or image(s) of an environment surrounding mobile device 101. In other instances, API(s) 119 may determine spatial positioning, backup or erase a memory (not shown), configure (or reconfigure) functions, obtain usage logs, terminate services, etc., of or associated with mobile devices 101.

In exemplary embodiments, mobile devices 101 transmit, via one or more of networks 109-115, the one or more signals captured from an audio interface and/or an imaging interface of mobile devices 101 to platform 103. Other information or signals may also be transmitted by mobile devices 101 to platform 103, such as spatial positioning information, device usage information, images of memories of mobile devices 101, etc. These signals and/or information may be stored to any suitable storage location or memory of (or accessible to) the components and/or facilities of system 100, such as tracking content repository 123. In other instances, the signals and/or information may be presented to subscribers, such as via one or more GUI(s).

As seen in FIG. 1, service provider network 111 enables client devices 101, 105, and 107 to access the features and functionality of platform 103 via one or more of networks 109, 113, and 115. Networks 109-115 may be any suitable wireline and/or wireless network. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 111 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions. As such, the conjunction of networks 109-115 may be adapted to facilitate the remote control and tracking services of system 100.

According to exemplary embodiments, client devices 101, 105, and 107 may include any customer premise equipment (CPE) capable of sending and/or receiving information over one or more of networks 109-115. For instance, voice terminal 107 may be any suitable plain old telephone service (POTS) device, facsimile machine, etc., whereas mobile terminal 101 may be any cellular phone, radiophone, satellite phone, smart phone, wireless phone, or any other suitable mobile device, such as a personal digital assistant (PDA), pocket personal computer, tablet, customized hardware, etc. Further, computing device 105 may be any suitable computing device, such as a VoIP phone, skinny client control protocol (SCCP) phone, session initiation protocol (SIP) phone, IP phone, personal computer, softphone, workstation, terminal, server, etc. Even though only a limited number of user devices 101, 105, and 107 are illustrated, it is contemplated that system 100 can support a plurality of user devices 101, 105, and 107.

As previously mentioned, system 100 may also include user profiles repository 117 for storing subscriber information, such as billing information, contact information, demographic information, location information, mobile station configurations, subscription parameters, and the like. User profiles repository 117 may also be utilized to store data relating to authorized users of the remote control and tracking services of system 100, as well as associated authorization information corresponding to those users. Namely, a user of mobile device 101 may establish one or more sub-profiles including usernames, passwords, codes, PINS, etc. to further distinguish various override scenarios. While user profiles repository 117 is depicted as an extension of service provider network 111, it is contemplated that user profiles repository 117 can be integrated into, collocated at, or otherwise in communication with any of the components or facilities of system 100.

In this manner, repositories 117 and 123 may be maintained by a service provider of the remote control and tracking services of system 100 or may be maintained by any suitable third-party. It is contemplated that the physical implementation of repositories 117 and 123 may take on many forms, including, for example, portions of existing repositories of a service provider, new repositories of a service provider, third-party repositories, and/or shared-repositories. As such, repositories 117 and 123 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when repositories 117 and 123 are provided in distributed fashions, information and content available via repositories 117 and 123 may be located utilizing any suitable querying technique, such as electronic number matching, distributed universal number discovery (DUNDi), uniform resource identifiers (URI), etc.

Thus, a subscriber of (or an individual authorized to use) the remote control and tracking services of system 100 may initialize a communication session at client devices 105 and 107, as well as at another mobile unit (not shown) to interact with remote application 121 so as to remotely control, configure, monitor, track, etc., mobile device 101. Furthermore, although the remote control and tracking services are described with respect to a mobile device 101, it is recognized that the remote control and tracking services may be applied to any device capable of providing voice communications, such as client devices 105 and 107. In other instance, mobile devices 101 may be integrated with other devices, individuals, objects, etc., and thereby enable subscribers to remotely control, configure, monitor, and/or track these other devices, individuals, objects, etc. While system 100 has been described in accordance with the depicted embodiment of FIG. 1, it is contemplated that system 100 may embody many forms and include multiple and/or alternative components and facilities.

Figure 2:
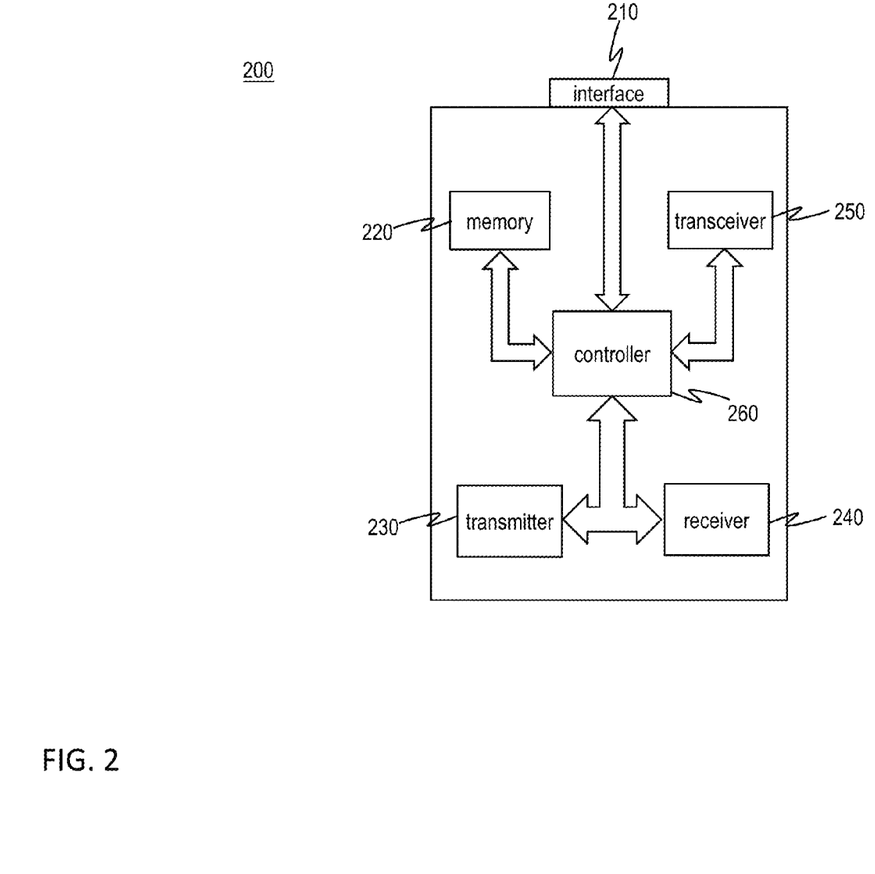
FIG. 2 is a diagram of an acoustic transmission unit for restricting the use of mobile devices, according to one embodiment.

FIG. 2 illustrates a vehicle device, such as an acoustic transmission unit 200, in accordance with at least one embodiment. The acoustic transmission unit 200 includes an interface 210 which allows it to communicate with a vehicle. According to at least one embodiment, the interface 210 is configured such that it connects directly to a data communication port located within the vehicle. One such communication port is an on-board diagnostics port commonly referred to as OBD-II. The on-board diagnostics port 210 communicates with various systems and controllers located within the vehicle. This allows retrieval of information, for example, associated with engine management, fuel delivery, fuel mixture, sensors, exhaust, etc. A common use of the on-board diagnostics port 210 is to allow a technician to quickly and easily diagnose problems with the vehicle and provide appropriate solutions.

The acoustic transmission unit 200 also includes a memory 220 that can be used to store various types of information. According to at least one embodiment, the memory 220 can be in the form of read only memory (ROM) which allows data stored therein to be retained even when no power is supplied to the acoustic transmission unit 200. According to other embodiments, the memory 220 can be in the form of a PROM, and EPROM, a FLASH-EPROM which allow appropriate personnel to change the contents stored therein. Such a feature allows information to be updated when changes are made to the contents of the memory 220, without having to replace the entire acoustic transmission unit 200. According to at least one embodiment, the memory 220 is used to store a database (not shown) which contains various specifications for different vehicles. For example, the database can include a vehicle model, make, year of production, and physical dimensions. At least one physical dimension can be the distance between the driver seat and the location of the on-board diagnostics port. Since most vehicles include an ability to adjust the driver seat forward, backward, up, down, etc., the information stored in the database can account for such variations in dimension.

The acoustic transmission unit 200 also includes a transmitter 230 and a receiver 240. The transmitter 230 and receiver 240 are used to transmit (or emit) and receive (or detect) sound waves to and from mobile devices 330 located within the vehicle. According to at least one embodiment, the transmitter 230 and receiver 240 are configured to transmit and receive sound waves having a frequency above the audible range of normal human hearing, i.e., about 20 KHz. Such frequencies are sometimes referred to as ultrasound frequencies. Alternatively, the sound waves can be within the human audible spectrum. According to at least one embodiment, the transmitter 230 can be configured as a speaker capable of operating at the required frequencies, and the receiver 240 can be configured as a microphone capable of detecting the required frequencies.

A wireless transceiver 250 is also provided to communicate with the mobile device, as well as the service provider network 111. Thus, the wireless transceiver 250 is capable of providing information to either the mobile device and/or the service provider network 111 in real-time. According to at least one embodiment, the wireless transceiver 250 is capable of communicating with the mobile device using the Bluetooth protocol. According to another embodiment, the wireless transceiver 250 communicates with the service provider network 111 using any supported voice and/or data communication protocol. Thus, the wireless transceiver 250 would communicate with the mobile device via the service provider network 111. Alternatively, the wireless transceiver 250 may incorporate functionality associated with both a Bluetooth communication protocol, as well as the voice and/or data communication protocol employed by the network. Such an embodiment would allow the wireless transceiver 250 to communicate with the mobile device using the Bluetooth protocol, while using a protocol such as LTE to exchange data with the service provider network 111.

A controller 260 is provided to control and direct operation of all the components contained within the acoustic transmission unit 200, namely the memory 220, transmitter 230, receiver 240, interface 210, and wireless transceiver 250. The controller 260, for example, determines the frequency at which the acoustic waves are transmitted, and controls the sampling frequency with which they are received. According to at least one embodiment, the controller 260 retrieves information from the vehicle through the interface 210 connected to the on-board diagnostics port. This information is used to query the database stored in the memory 220 in order to obtain specification information for the particular vehicle being driven. The controller 260 also determines what information should be transmitted to either the mobile device, the service provider network 111, or both. As will be discussed in greater detail below, this information can be used to determine whether or not the mobile device belongs to the driver of the vehicle, and can be used to initiate the necessary protocols to prevent and/or restrict use of the mobile device.

Figure 3:
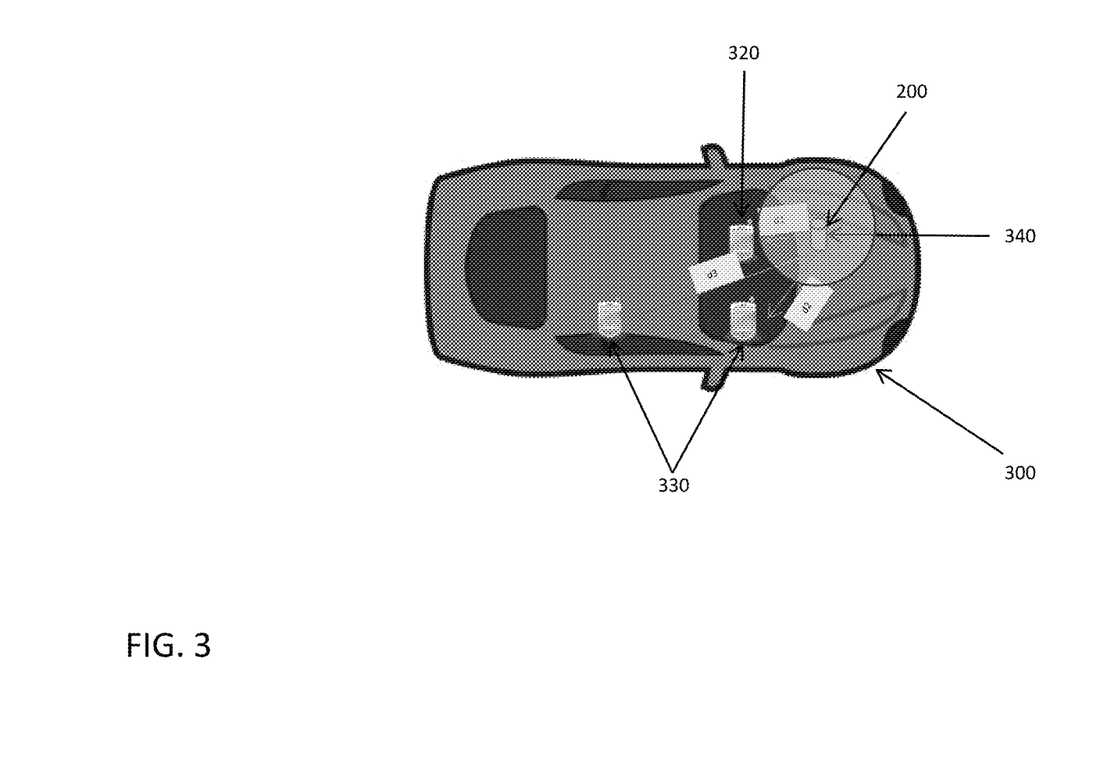
FIG. 3 is a diagram illustrating an arrangement for restricting the use of mobile devices, according to one embodiment.

FIG. 3 illustrates a system 300 for preventing distracted driving in accordance with at least one embodiment. As illustrated in FIG. 3, the system 300 includes a vehicle 310 which has an on-board diagnostics port 340. On-board diagnostics ports have been mandated by the federal government since 1996. Therefore, the vast majority of vehicles on the road today include such a port. Typically, the on-board diagnostics port 340 is located generally beneath the steering wheel. According to at least one embodiment, the acoustic transmission unit 200 is connected to the on-board diagnostics port 340 via the interface 210, and becomes substantially located at the same position as the on-board diagnostics port 340. The vehicle 310 is indicated as having three occupants, each of whom has a mobile device. Reference numeral 320 identifies the driver mobile device, while reference numeral 330 identifies the passenger mobile devices. According to at least one embodiment, distance d1 represents the maximum distance between the driver mobile device 320 and the acoustic transmission unit 200. Distances d2 and d3, for example, represent typical distances between the acoustic transmission unit 200 and mobile devices 330 belonging to other occupants of the vehicle 310, such as a front passenger and one or more rear passengers. According to one or more embodiments, the distance d1 is determined by the controller 260 based on data which corresponds specifically to the particular vehicle 310 being driven. As previously discussed, the memory 220 can store a database which contains information for different vehicles. This information can therefore be used to calculate the necessary parameters.

Figure 4:
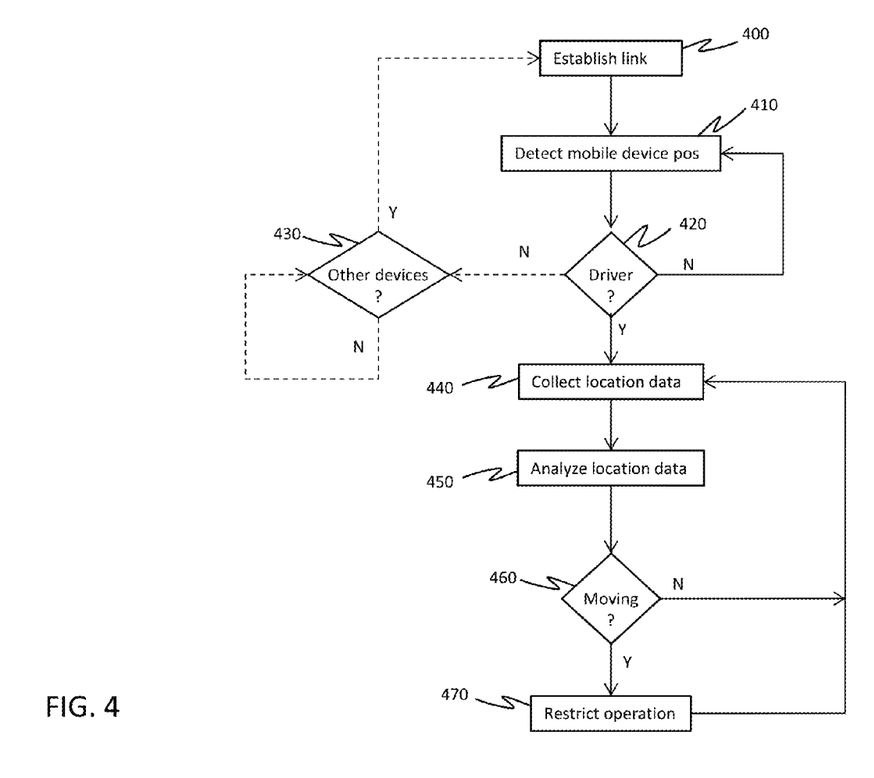
FIG. 4 is a flowchart of a process for restricting the use of mobile devices, according to one embodiment.

FIG. 4 is a flowchart of a process for preventing distracted driving in accordance with at least one embodiment. For the purpose of illustration, the process is described with respect to FIG. 1. It is noted that the steps of the process may be performed in any suitable order, as well as combined or separated in any suitable manner. In one embodiment, the process is performed by the acoustic transmission unit 200. In one embodiment, the process is performed by the driver mobile device 320. In yet another embodiment, the process is performed using a combination of the acoustic transmission unit 200 and the driver mobile device 320.

At step 400, a link is established between the acoustic transmission unit 200 and mobile devices (320, 330) located within the vehicle 310. As previously discussed, the acoustic transmission unit 200 can communicate with a mobile device in various ways, including Bluetooth or the service provider network 111. Accordingly, the acoustic transmission unit 200 could, for example, utilize the wireless transceiver 250 to establish a link to one or more of the mobile devices. Each mobile device within vehicle 310 determines its distance from the acoustic transmission unit 200. This is done at step 410. Once the distance has been obtained, the mobile device determines if its proximity is close enough to the driver to be considered the driver mobile device 320. This is done at step 420.

According to at least one embodiment, the acoustic transmission unit 200 can be configured to determine the position of the mobile device within the vehicle 310. This would be done at step 410. Based on the position of the mobile device, the controller 260 determines, at step 420, whether it is in close enough proximity to the driver to be considered the driver mobile device 320. If it is determined that the mobile device does not belong to the vehicle driver, the acoustic transmission unit 200 determines if other mobile devices 330 are present in the vehicle 310. According to the example shown in FIG. 3, the acoustic transmission unit 200 would determine, at step 430, that two other mobile devices 330 are present in the vehicle 310. If it is determined, at step 430, that other mobile devices 330 are present, then the acoustic transmission unit 200 attempts to establish a link to each mobile device in order to determine its position within the vehicle 310. Thus, the flow returns to step 400. As can be appreciated, there will be circumstances where other mobile devices 330 are not present in the vehicle 310. According to one or more embodiments, the acoustic transmission unit 200 can continually monitor for other mobile devices 330 at predetermined intervals.

At step 440, the vehicle's location data is collected. According to one embodiment, the movement data is obtained from the driver mobile device 320 itself. For example, GPS data and accelerometer data can be used to determine whether or not the driver mobile device 320 is moving as well as the velocity at which it is moving. According to other embodiments, the movement data is collected from the vehicle 310 through the on-board diagnostics port 340. Under such conditions, the driver mobile device 320 is considered to be within the same frame of reference as the vehicle 310. Thus, all movement performed by the vehicle 310 is presumed to be also performed by the driver mobile device 320. The data obtained through the on-board diagnostics port 340 can include, for example, speed data, engine speed data, fuel delivery data, etc. As can be appreciated, the foregoing list is not intended to be an exhaustive list of information pertaining to the vehicle 310 that can be collected through the on-board diagnostics port 340.

At step 450, the movement data is analyzed. Based on this analysis, the mobile device 320 determines whether or not the vehicle 310 is currently moving. Optionally, the controller 260 could be configured to determine whether or not the vehicle 310 is currently moving. According to at least one embodiment, the data can be analyzed to determine the approximate speed at which the vehicle 310 is moving. If the vehicle 310 is not moving, then the acoustic transmission unit 200 simply continues to collect and analyze movement data until the status of the vehicle 310 changes. For example, if a user enters the vehicle 310 and starts the ignition, but remains in a parking lot, the acoustic transmission unit 200 would conclude that the vehicle 310 is not moving. Accordingly, the driver would have full access to functions on the driver mobile device 320. By continually collecting the movement data, the acoustic transmission unit 200 is capable of determining when the vehicle 310 begins moving and takes appropriate action. This is illustrated at step 470 wherein operation of the driver mobile device 320 is restricted.

Figure 5:
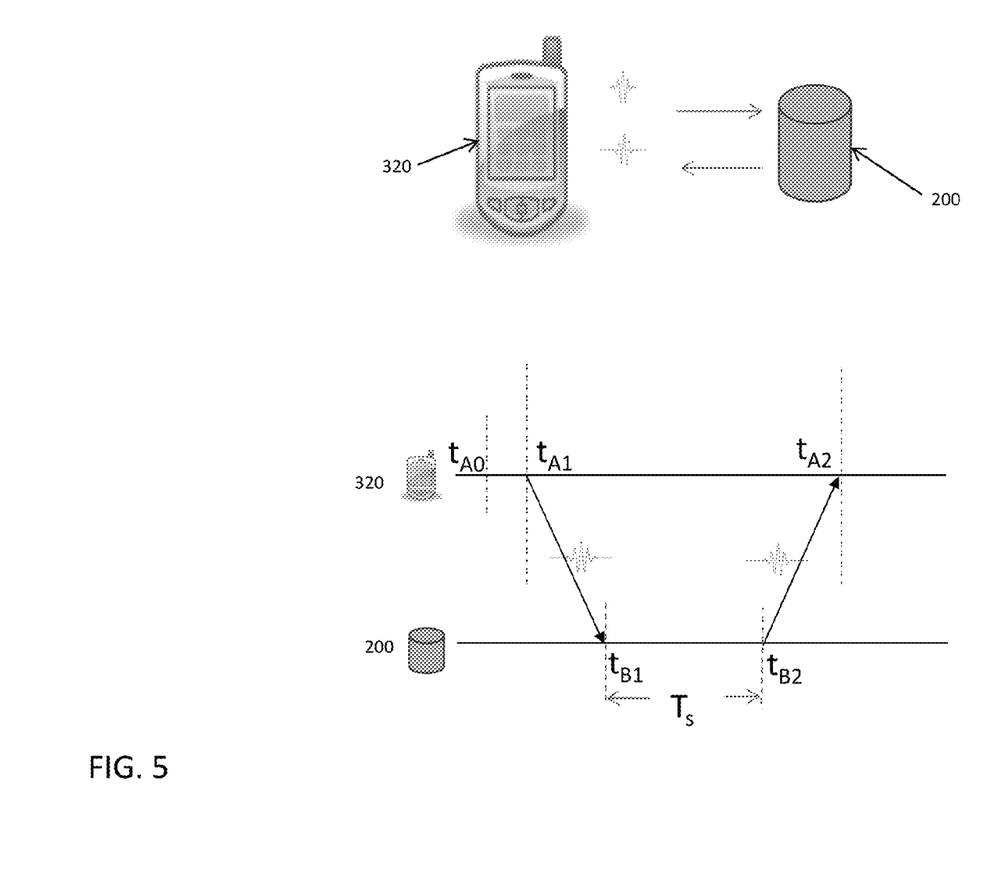
FIG. 5 is a diagram illustrating an acoustic ranging process for identifying the location of a mobile device within a vehicle, according to one embodiment.

FIG. 5 illustrates an acoustic ranging process which can be used to determine the location of mobile devices within the vehicle 310, according to one embodiment. More particularly, the acoustic ranging process utilizes sound (or acoustic) waves to measure the distance between the acoustic transmission unit 200 and the mobile device(s) present in the vehicle 310. This can be done with relative accuracy, i.e., a few inches, in order identify the location of the mobile device. According to at least one embodiment, the acoustic transmission unit 200 and mobile devices within vehicle 310 transmit the sound waves at ultrasound frequencies that are above the frequencies audible by humans.

According to one embodiment, the mobile device first issues a command to transmit a sound wave through its speaker at timestamp $t_{A0}$. The sound wave is detected by a microphone of the mobile device at timestamp $t_{A1}$. The same sound wave is also detected by the receiver 240 of the acoustic transmission unit 200 at timestamp $t_{B1}$. When determining the distance of the mobile device from the acoustic transmission unit 200, using the time of detecting the sound wave at timestamp $t_{A1}$ instead of the transmit command time at timestamp $t_{A0}$ as a reference avoids delays associated with internal processing and management of concurrent running apps on the mobile device. Such delays between the time when such command is issued and the time when the audio signal actually goes in the physical media would induce error in determining the distance between the mobile device and the acoustic transmission unit 200 because the delays can vary among different mobile devices 330, and even for the same mobile device, depending on operating conditions such as CPU load, available memory, etc.

A predetermined delay $T_s$ is allowed to pass after the acoustic transmission unit 200 detects the sound wave at timestamp $t_{B1}$. The acoustic transmission unit 200 then transmits a second sound wave through its transmitter 230 at timestamp $t_{B2}$. The second sound wave is detected by the mobile device through its microphone at timestamp $t_{A2}$. According to at least one embodiment, $t_{B2}$ is defined as:

$$t_{B2} = t_{B1} + T_s$$

The mobile device then applies at least one formula to calculate the distance between the mobile device and the acoustic transmission unit 200. According to at least one embodiment, the distance is calculated according to the following formula:

$$\text{Distance} = C/2 * (t_{A2} - t_{A1} - T_s), \text{ where } C \text{ is the nominal speed of sound in air.}$$

According to other embodiments, accuracy of the distance calculation can be improved by considering current environmental conditions. More particularly, the mobile device can obtain real-time data capable of affecting the speed of sound such as, for example, ambient temperature, humidity, altitude, etc. This information can then be used to modify the distance equation and/or select a value for C which compensates for ambient conditions.

According to alternative embodiments, the distance calculations can be performed by the controller 260 located in the acoustic transmission unit 200. The controller 260 could, for example, initiate predetermined protocols resident on an application layer of the mobile device in order to request transmission of the initial sound wave and/or receive the values for $t_{A1}$ and $t_{A2}$ from the mobile device. The controller 260 can also cause to acoustic transmission unit 200 to communicate with the service provider network 111 and obtain regional ambient weather data for use in the distance calculation.

The calculated distance is then compared to the threshold radius d1 in order to determine if the mobile device is located on, or in close proximity to the driver. This would suggest that the detected mobile is actually the driver mobile device 320. Since the internal space configurations as well as the precise location of the on-board diagnostics port 340 can vary between vehicles, the threshold radius d1 is selected in accordance with specifications for the particular vehicle being driven. The acoustic transmission unit 200 therefore retrieves vehicle information through the on-board diagnostics port 340 in order to determine the make and model of the vehicle 310. Reference data, for example predetermined threshold radius d1, for the specific vehicle can then be retrieved, for example, from the database stored in the memory 220. According to various embodiments, the database can also store threshold radius d1 values for different vehicles. Thus, the controller 260 can query the database in order to retrieve a value for the threshold radius d1 for the specific vehicle being used and/or driven. Alternatively, the database can store key dimensions and the threshold radius d1 can be calculated in real-time based on the current position of the driver seat. According to other embodiments, the database can also be stored on the mobile device or management platform of the service provider. Under such circumstances, the mobile device can optionally query the database and retrieve a value for the threshold radius d1.

The acoustic transmission unit 200 can subsequently restrict and/or limit use of the driver mobile device 320 if it is located within the threshold radius d1 and the vehicle 310 is in motion. According to an embodiment, sensor information can be used to provide assistance in determining the location of the mobile device. For example, most vehicles are equipped with one or more sensors which detect the presence or absence of a front seat passenger. Information from such sensors can be used to improve the accuracy of identifying a mobile device as a driver mobile device 320. Specifically, if a mobile device is placed on the front passenger seat, acoustic measurement of its location would suggest that it does not belong to the driver. By combining this location information with sensor data indicating the absence of a passenger, for example, it can be concluded that the driver mobile device 320 has been placed on the front passenger seat. Appropriate action could therefore be taken to restrict and/or limit use of the driver mobile device 320. It should be noted, however, that it is impractical for a driver to operate a mobile device while it is located on the front passenger seat. Rather, the driver is more likely to retrieve the mobile device and bring it within reasonable proximity. According to at least one embodiment, the acoustic transmission unit 200 continually monitors the location of the driver mobile device 320 at predetermined intervals. Accordingly, the driver mobile device 320 would be subject to the aforementioned restrictions upon entering the space defined by the threshold radius d1.

According to at least one embodiment, the software for restricting operation of the driver mobile device 320 can be configured in an energy-efficient middleware platform that is embedded within the operating system of the mobile device. Upon receiving a signal to restrict access to the driver mobile device 320, the middleware platform switches to a driving mode wherein limited, or no, access is available to the driver. For example, the driver may be prevented from accessing applications pertaining to phone, GPS, music, email, etc. According to one embodiment, the driver may only be allowed to access emergency phone functions.

According to one or more embodiments, a configuration interface can be provided at an account management level to select specific functions that will be available while driving the vehicle 310. For example, a user can use the configuration interface to allow access only to GPS navigation functions and emergency dialing. Parents can use the configuration interface to completely disable use of the driver mobile device 320 by young adult children that may have driving access to the vehicle 310. Thus, the vehicle 310 would have to come to a complete stop in order to access any functions, including emergency dialing. Alternatively, the driver mobile device 320 can be limited to emergency dialing. As can be appreciated, such combinations of available functions are only intended to be illustrative, and not all encompassing. Rather, the configuration interface can provide an extended list of functions that a user can selectively enable or disable while driving.

Figure 6:
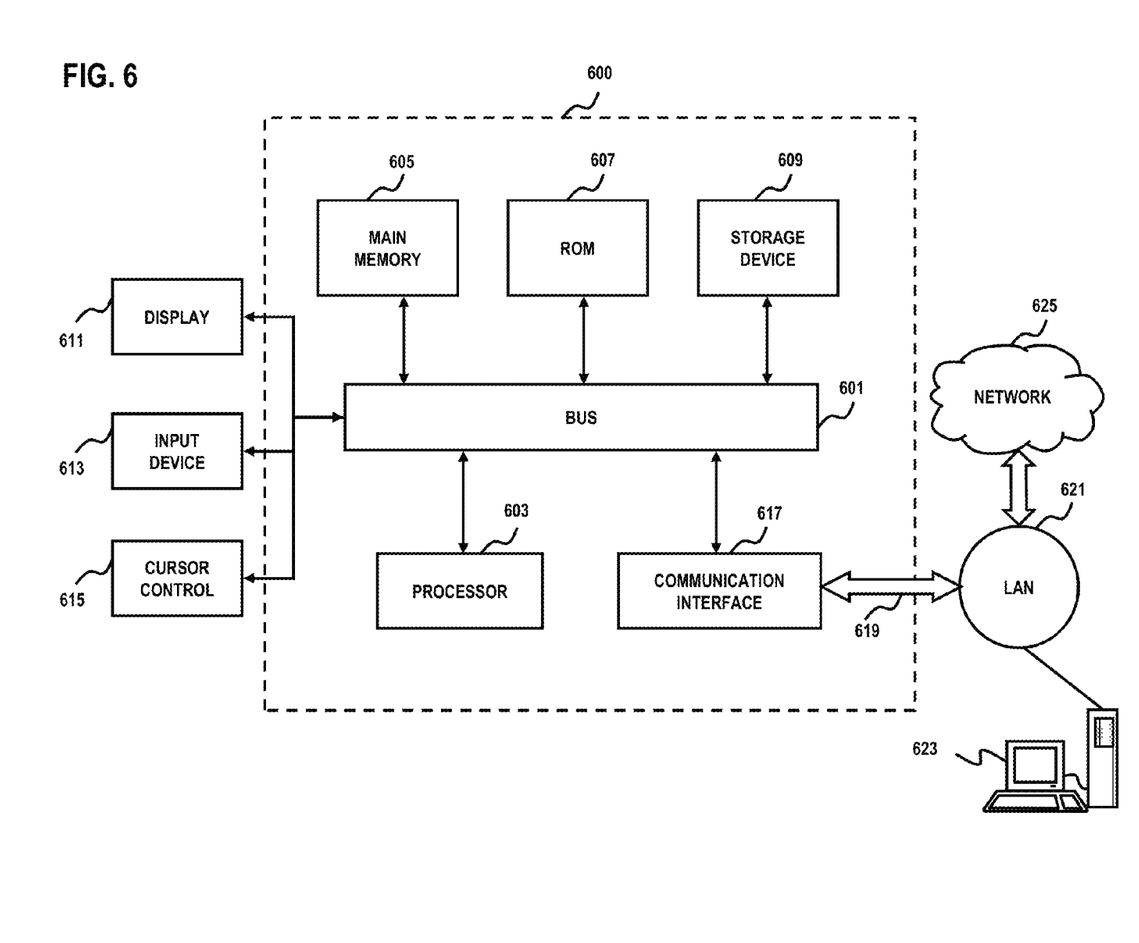
FIG. 6 is a diagram of a computer system that can be used to implement various exemplary embodiments.

FIG. 6 is a diagram of a computer system that can be used to implement various embodiments. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an exemplary embodiment, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement exemplary embodiments. Thus, exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 1000 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
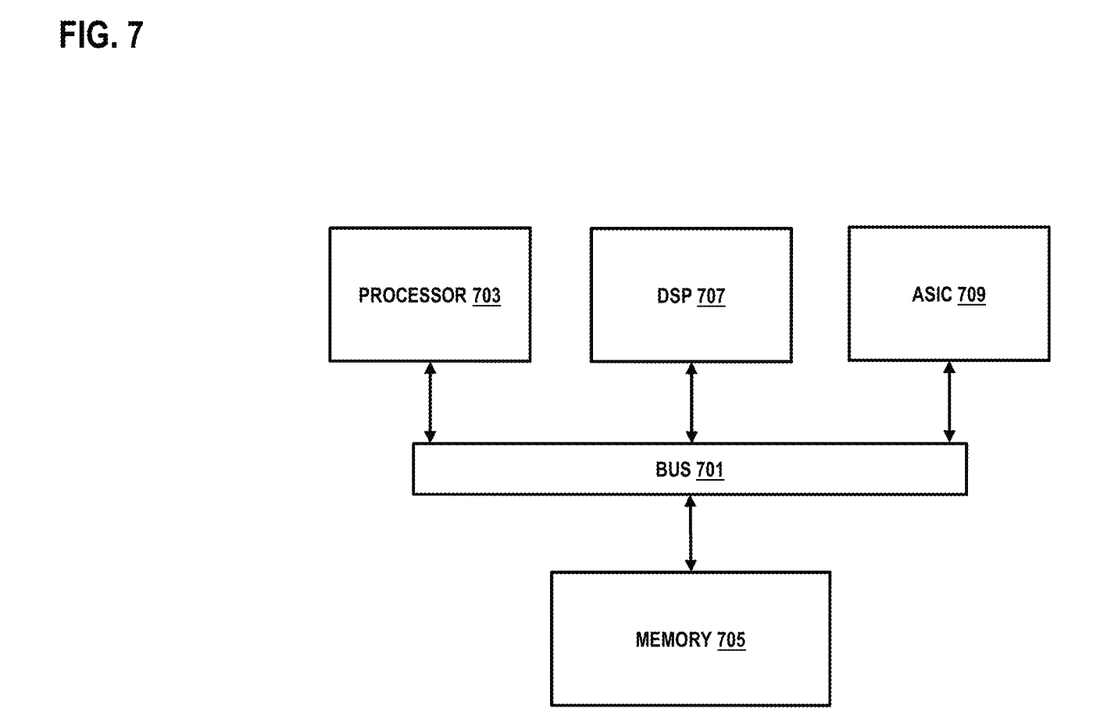
FIG. 7 is a diagram of a chip set that can be used to implement various exemplary embodiments.

FIG. 7 illustrates a chip set 700 upon which an embodiment may be implemented. Chip set 700 is programmed to determine and score driving quality in real-time while supporting various in-vehicle services and leverage information associated with and related to the driving experience as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 705 also stores the data associated with or generated by the execution of the inventive steps.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    establishing a link to a mobile device located within a vehicle;
    retrieving specification data from the vehicle;
    determining a location for the mobile device within the vehicle including performing an acoustic ranging process between the mobile device and an acoustic transmission unit positioned at a predetermined location within the vehicle, the acoustic ranging process including
        transmitting a first acoustic wave by the mobile device,
        receiving the first acoustic wave by the mobile device and the acoustic transmission unit,
        waiting a predetermined time interval,
        transmitting a second acoustic wave by the acoustic transmission unit,
        receiving the second acoustic wave by the mobile device, and
        calculating the distance between the mobile device and the acoustic transmission unit;
    collecting, in real-time, location data for at least one of the mobile device and the vehicle;
    analyzing the location data; and
    restricting at least one operation of the mobile device if the mobile device is located within a predetermined location within the vehicle and analysis of the location data indicates vehicle movement.

2. A method of claim 1, further comprising establishing a connection to the vehicle.

3. A method of claim 2, wherein the step of establishing a connection comprises establishing a connection to a data communication port of the vehicle.

4. A method of claim 1, wherein the step of collecting location data comprises collecting vehicle operation data.

5. A method of claim 1, wherein the step of collecting location data comprises collecting global positioning system (GPS) data from the vehicle.

6. A method of claim 1, wherein:
establishing a link comprises establishing a link to all mobile devices located within the vehicle; and
determining a location comprises determining a location for all mobile devices located within the vehicle.

7. A method of claim 1, wherein the predetermined location is selected based on a driver position.

8. A method of claim 1, wherein the predetermined location is selected based on a maximum distance between a driver position and the acoustic transmission unit.

9. The method of claim 1, wherein the restriction of at least one operation of the mobile device includes using control signals directly integrated into a control logic of the mobile device.

10. An apparatus comprising:
an interface for communicating with a vehicle;
a memory for storing at least specification data for one or more vehicles;
a transmitter for outputting acoustic waves at predetermined frequencies;
a receiver for receiving acoustic waves;
a wireless transceiver for communicating with at least one of a mobile device and a service provider network; and
a controller for controlling operation of at least the interface, the memory, the transmitter, the receiver, and the wireless transceiver, the controller being programmed to:
establish a link to the at least one mobile device located within the vehicle;
retrieve specification data from the vehicle;
determine a location for the mobile device within the vehicle, including performing an acoustic ranging process between the mobile device and the transmitter and the receiver, the acoustic ranging process including
causing transmission a first acoustic wave by the mobile device,
causing reception of the first acoustic wave by the mobile device and the acoustic transmission unit,
waiting a predetermined time interval,
causing transmission of a second acoustic wave by the acoustic transmission unit,
causing reception of the second acoustic wave by the mobile device, and
calculating the distance between the mobile device and the acoustic transmission unit;
collect, in real-time, location data from at least one of the mobile device and the vehicle;
analyze the location data; and
restrict at least one operation of the mobile device if the mobile device is located within a predetermined location inside the vehicle and analysis of the location data indicates vehicle movement.

11. An apparatus of claim 10, wherein:
the interface is configured for connection to a vehicle OBD-II port, and
the controller is further programmed to collect vehicle operation data via the OBD-II port.

12. An apparatus of claim 10, wherein the wireless transceiver is capable of communicating with the mobile device and/or service provider network using at least one cellular communication protocol.

13. An apparatus of claim 10, wherein the location data comprises GPS data from the mobile device.

14. An apparatus of claim 10, wherein the controller is programmed to determine a location for all mobile devices located within the vehicle.

15. A method of claim 10, wherein the predetermined location is selected based on a driver position.

16. A method of claim 10, wherein the predetermined location is selected based on a maximum distance between a driver position and apparatus.

17. The apparatus of claim 10, wherein the restriction of at least one operation of the mobile device includes using control signals directly integrated into a control logic of the mobile device.

* * * * *